Figure 1:
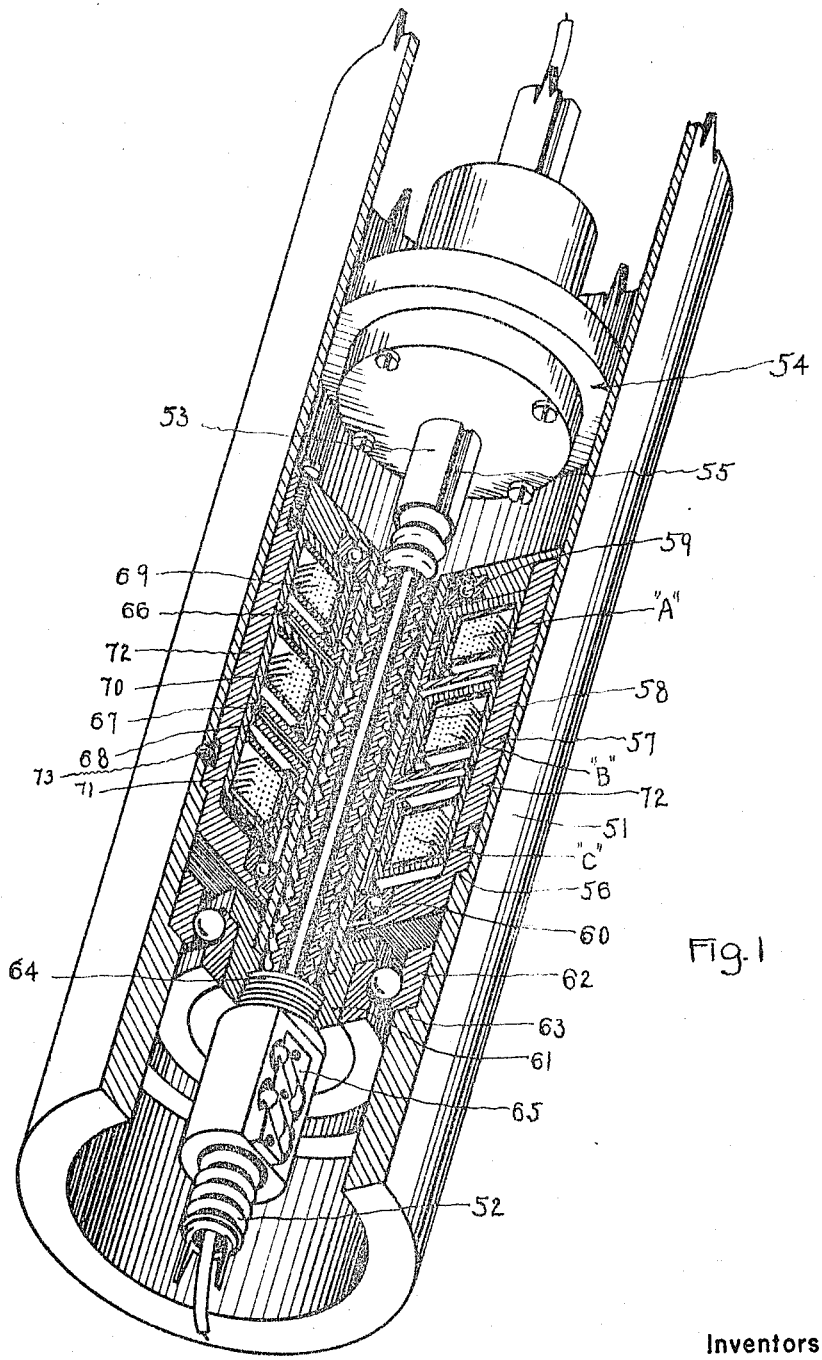

Inventors:
Chester W. Lytle,
Robert V. Suhrke &
William A. Bradley

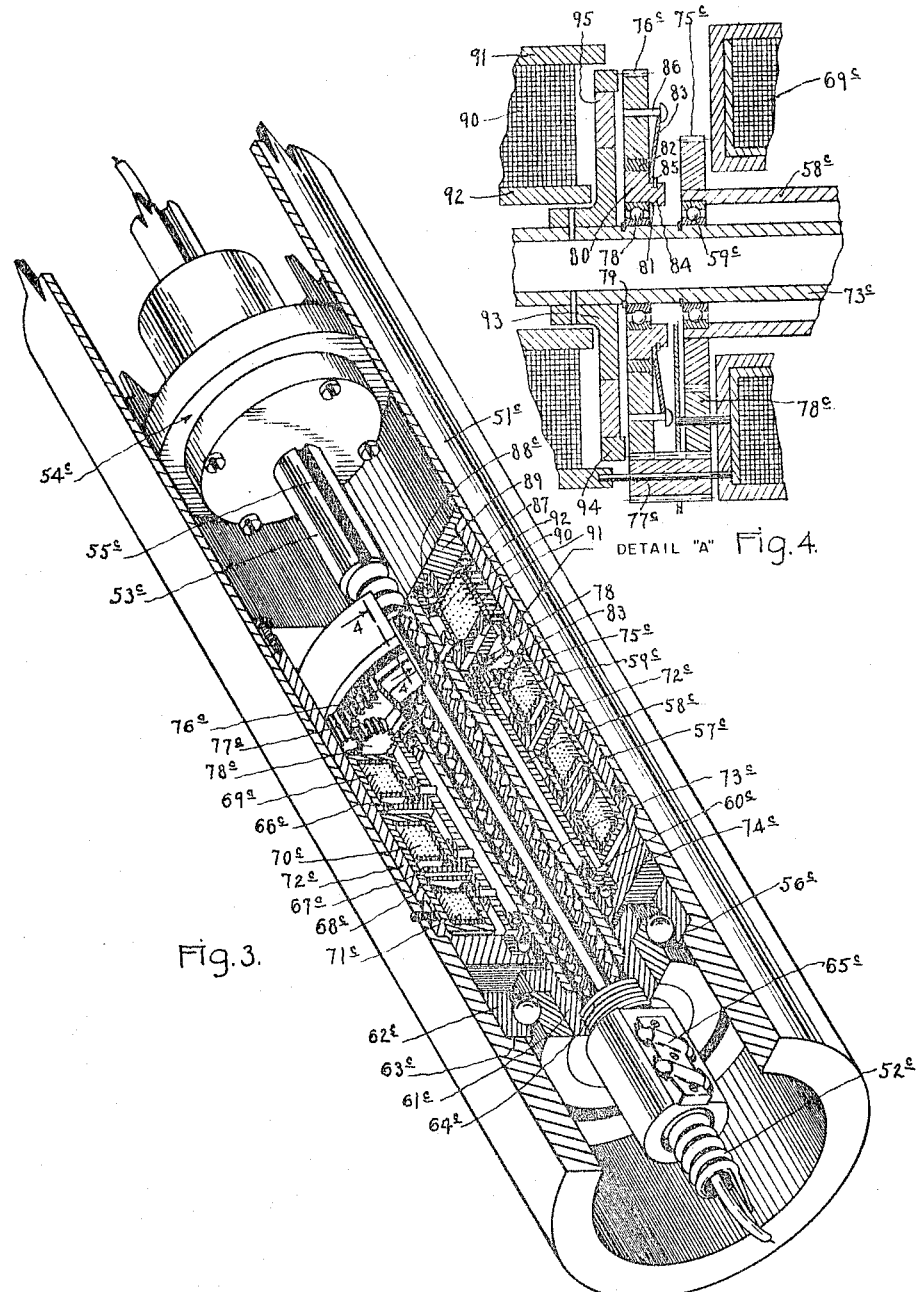

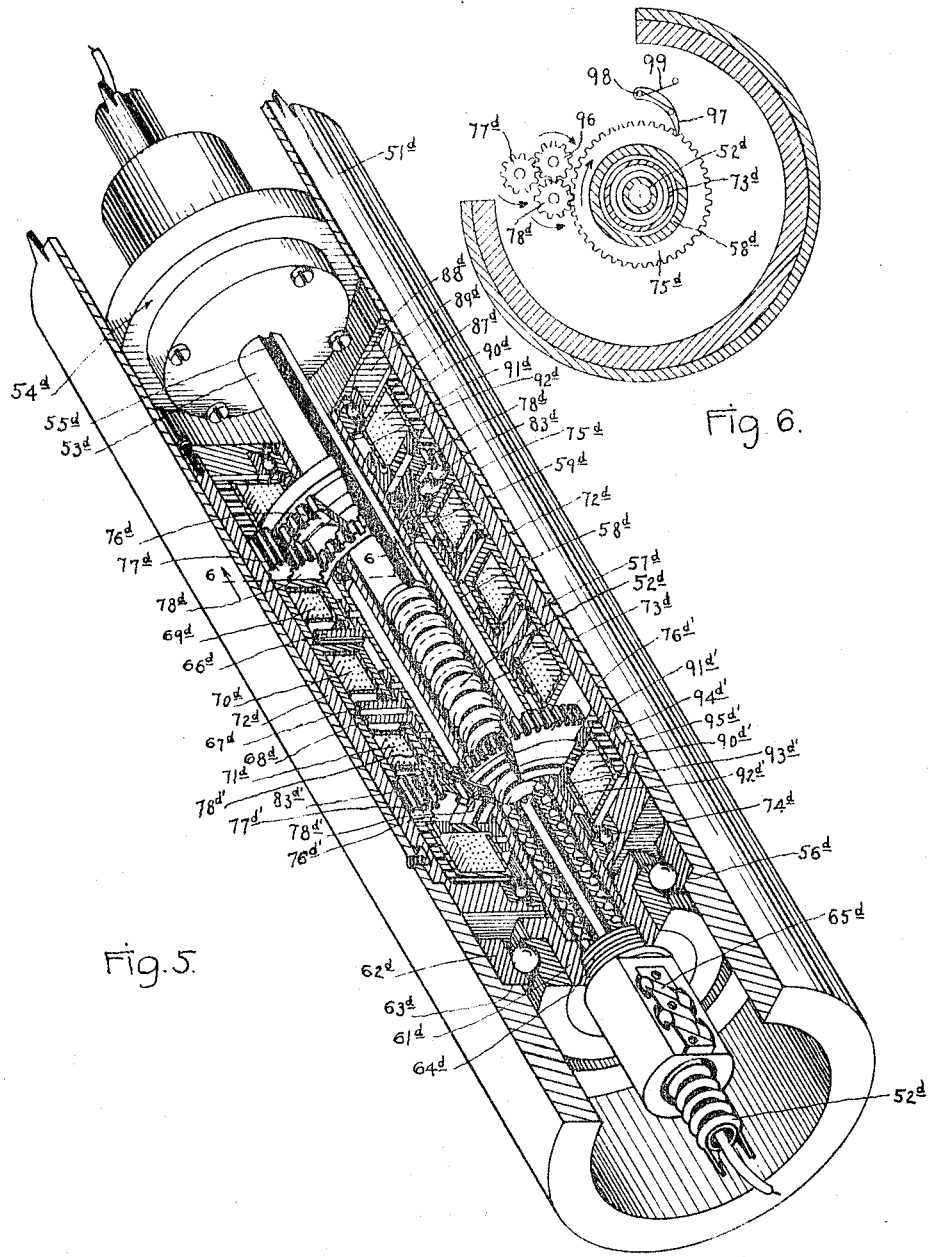

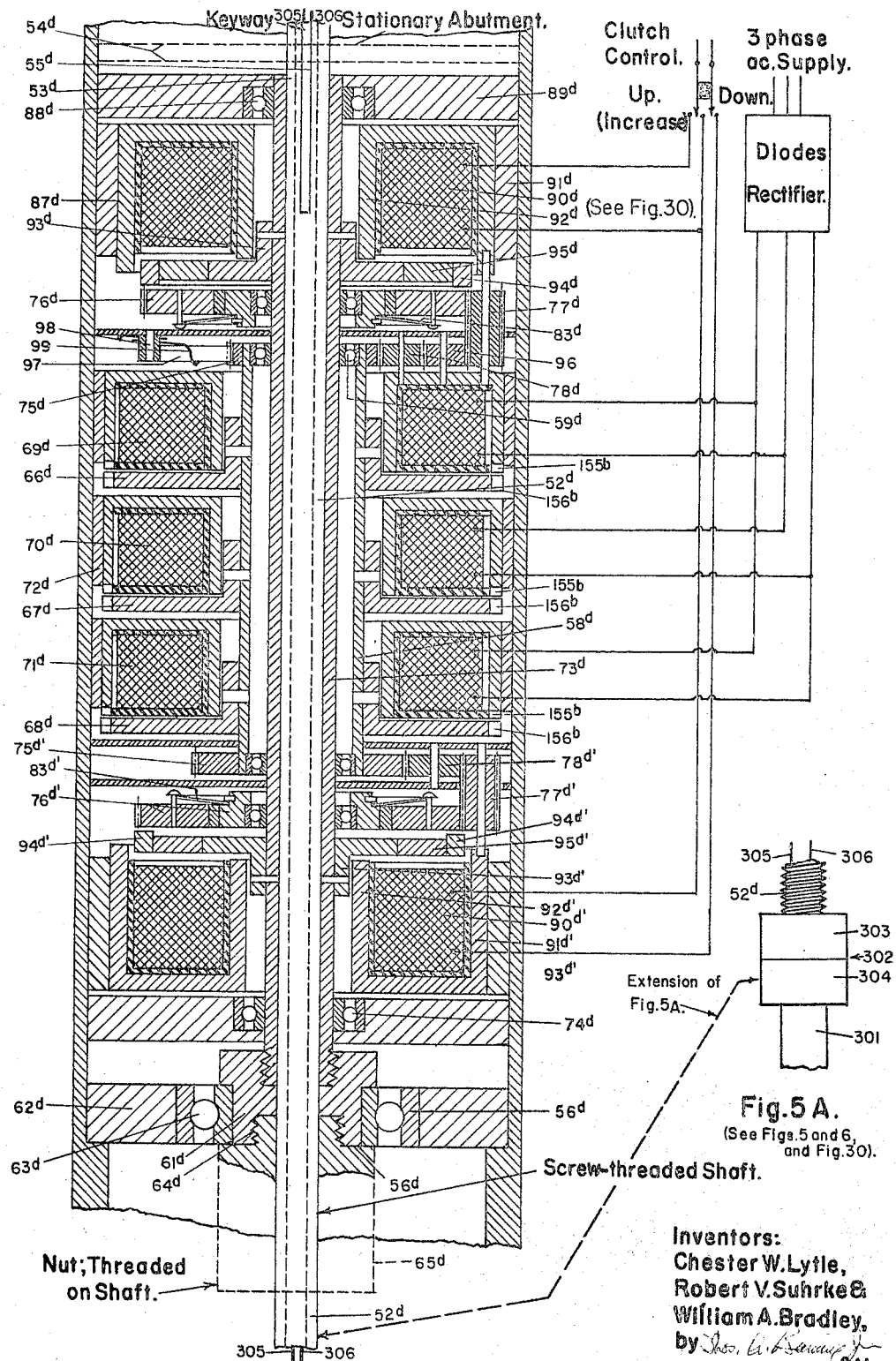

Inventors:
Chester W. Lytle,
Robert V. Suhrke &
William A. Bradley,
by
Atty.

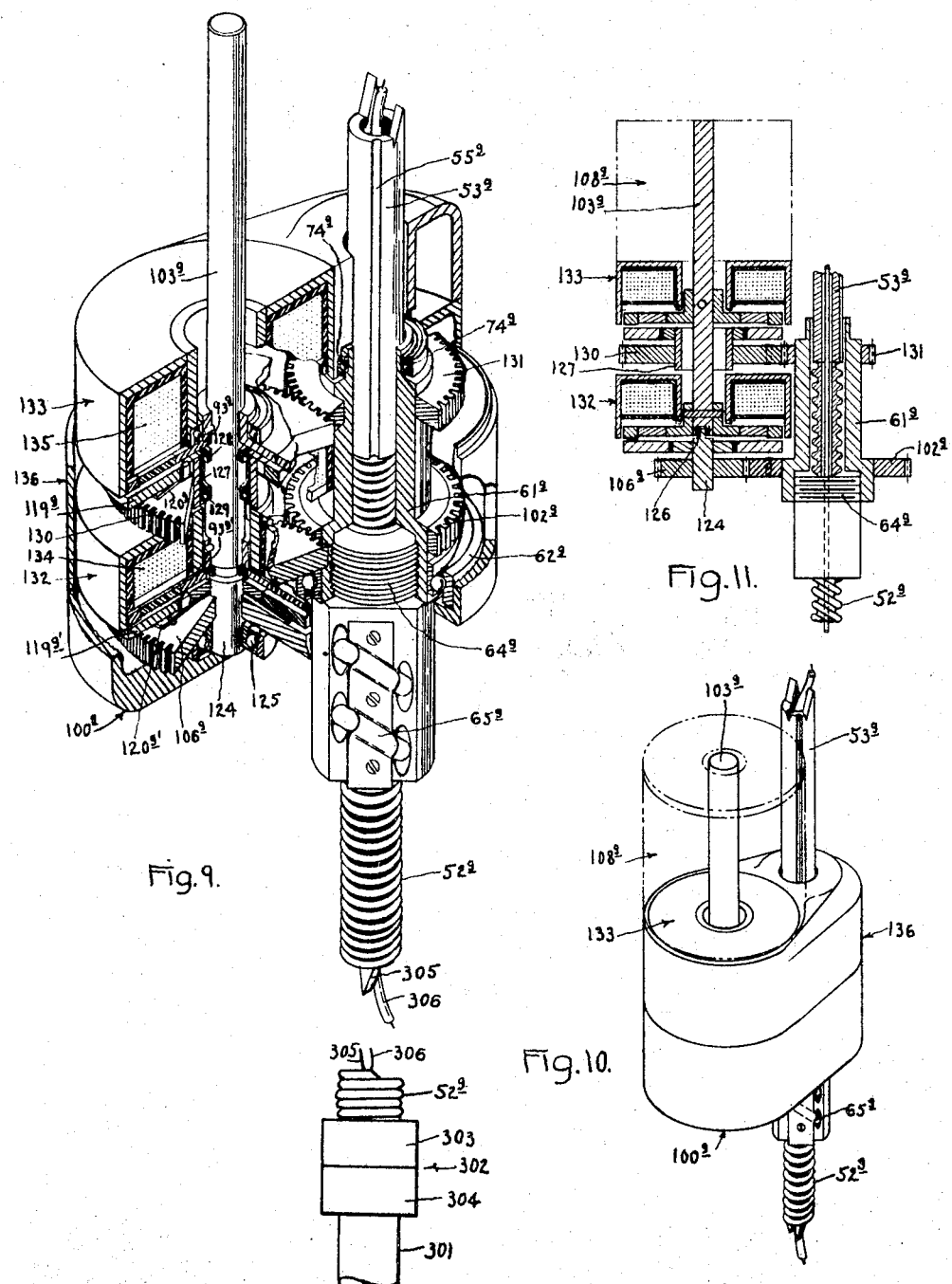

3,264,502
STEPPING MOTOR DRIVES FOR CONTROL RODS FOR REACTORS, AND THE LIKE

Chester W. Lytle, Chicago, Ill., Robert V. Suhrke, Colorado Springs, Colo., and William A. Bradley, Albuquerque, N. Mex., assignors, by mesne assignments, to Thomas A. Banning, Jr., Chicago, Ill.
Filed June 20, 1960, Ser. No. 37,503
10 Claims. (Cl. 310—49)

The present invention concerns itself with improvements in motor drives for control rods for reactors, and the like. The improvements hereinafter disclosed will include improvements in the control rod driving mechanism proper, as shown in several embodiments. The following comments are pertinent for the purpose of explaining some of the objectives attained by our improvements:

Presently disclosed embodiments are especially adapted for control of the rods of both commercial reactors used for generation of large amounts of heat energy, and also the rods used for control of experimental reactors. Such experimental or research reactors are of comparatively small size with corresponding limited space allowances to accommodate the rod control devices. Additionally, it is desirable in such research reactors to attain a high degree of accuracy in the control rod movements in order to ensure accuracy of results and data obtained from the operation of such research reactors.

Generally the control rods of a reactor are grouped at regular spacings center to center, and parallel to each other; and the center to center spacing of the rods is small. Accordingly, the drive and control connections to the rods must be compact in order to bring such drive and control elements into spacial relationship to their several rods. Usually such elements are carried by a suitable structure extending over the top of the reactor proper. It is desirable for various reasons to simplify such drive and control elements as much as possible, and to accommodate the drive and control elements for each rod withing a spacial limit substantially corresponding to the lateral dimensions required for such rod.

It is a prime object of the present invention to provide a drive and control element unit for each rod and so constituted and constructed that such unit shall not overreach the lateral dimensions assigned to its rod in any direction. In this connection we have herein disclosed a number of designs of such units, each of which conforms to the requirement that its areal extent or superficial horizontal area shall not exceed that assigned to the corresponding control rod; and generally such disclosed embodiments are of a substantially circular form of diameter not exceeding the center to center spacing of the control rods themselves. In some instances the enclosing perimeter of a disclosed embodiment is not entirely circular, but the units of such embodiments are so designed that their horizontal perimeters will intermesh with each other so that all such units may be accommodated in a common plane or height above the body of the reactor itself.

Each disclosed embodiment includes a drive motor individual to the control rod to which it corresponds, together with suitable gearing or like connections to a raising and lowering element to which the control rod is attached. It is evidently necessary to deliver power from such motor to its control rod attachment during the raising operation of such rod. In some cases the lowering of the rod may be permitted solely by gravity but in other cases such lowering may be effected by motor drive, thus controlling the speed of descent by motor speed control. It is here noted that usually the raising operation is effected rather slowly and under accurate control, both as to speed of rise and exact positioning of the limit of such rise. This is desirable since such raising of the control rods effects increase of the nuclear reaction, and must be so controlled to avoid any possibility of a runaway condition occurring. On the contrary, it is often desired, and sometimes absolutely necessary to effect very fast lowering to shut off the reactor under emergency conditions. In such emergency condition the rod may be allowed to fall to its most lowered position, without interference from or hindrance imposed by need of rotating the motor rotor during such descent. The embodiments herein disclosed include provision for such emergency operating conditions.

When it is desired to lower the control rod under normal operating conditions, so as to closely control the heat output of the reactor according to load changing conditions, such lowering may be effected faster than the raising operations, since no danger of producing a runaway condition of the reactor can be present when the nuclear reaction is being decreased. It is thus desirable to provide for normal lowering operations at a faster rate than normal raising operations. It is also desirable under some conditions to be able to effect such motor lowering operation at such faster rate than the motor raising operation, without need of corresponding change of the speed of the drive motor. We have herein disclosed arrangements whereby with a geared connection between the motor and the control rod movement producing means, a faster driven rod operation is produced during descent of the rod than during rise thereof. Such embodiments also include clutch means between the drive motor and the rod movement producing means, so that selection may be made as between the fast rod movement operation and the slower rod movement operation. Such clutch means should normally function to ensure the fast rod operation during descent only, and should ensure under every possible condition that the raising operation of the rod be at the slow rate. In order to ensure against possible error in direction of the motor rotor during the rising operation we have included in such embodiments provision to positively lock the rod movement producing means against possible drive at the faster rate when a raising operation is to occur. Such an error might be produced, for example, by a false connection to the motor during an electrical repair job or under other abnormal conditions.

It will frequently be desirable to make provision for clutching and unclutching the drive motor to and from the rod movement producing means, with provision for producing the clutching and unclutching operations as needed. We have herein disclosed such clutching means. Several clutching arrangements are disclosed herein to meet corresponding operational or protective desires or requirements. In one such embodiment the clutch is located between the rod movement producing means and the final gear of a gear reduction from the drive motor to the rod movement producing means, when the motor is reversible for the up and down rod movements. In another embodiment we have provided two gear trains between the motor and the rod movement producing means, which gear trains are of different ratios of reduction from the motor rotor to the rod movement producing means, and have provided a clutch corresponding to and operative with each such gear train. With this arrangement, when the motor is reversible it is possible to produce either of two rates of movement of the control rod movement producing means, in either the up or the down rod driving direction. Such operations are desirable in some installations. Also, with this arrangement the rod movement producing means may be deadlocked against movement in either direction by simultaneously energizing both of the clutches. Another embodiment is disclosed in which one of the gear trains includes an extra gear so that, with a unidirectional rotation motor the rod may be driven either up or down by energizing the proper clutch. This embodiment also includes means to positively lock the gear train for the higher rate of rod movement against possible drive of the rod movement producing means in the rod raising direction, to thus protect against fast raising of the rod due to an improper or undesred functioning of the clutch controls. Such protection is desirable in some installations. Another embodiment is shown in which the clutch is brought to its clutching condition by proper energization of such clutch, but is normally engaged with a stationary element, so that in the absence of such clutch energization the rod movement producing means is normally locked against movement by such clutch.

Another feature of the invention concerns itself with the provision of a construction or constructions of unit in which the motor axis is concentric with the rod and the rod movement producing means, thus bringing the unit into a very small overall dimension. In this connection it has been found that in the case of some types of reactors, notably "swimming pool" reactors, in which the center to center spacing of the rods frequently does not exceed 2.5″–3.0″, it is still possible to bring the overall diameter of the motor (when thus concentric with the control rod which it controls) within such center to center spacing of the control rods; thus making it possible to produce a very compact rod control unit, and to avoid undesirable staggering of the motor drive elements so that parts of each such element may overlap the perimeters of one or more adjacent control rod assemblies. This ability to bring the motor element for drive of the rod into such small confines is in some cases due to the characteristics of the drive motor itself, as will appear more fully hereinafter.

In connection with the foregoing objective, it is also an object to bring the necessary gearing, clutches, and related elements into a very compact and orderly ensemble, so that the entire rod movement producing mechanism may be contained within the desired limited perimeter explained above. Various of the embodiments hereinafter described in detail accomplish this desirable objective.

Nevertheless, it is also possible, if desired, to incorporate various of the improvements already referred to in embodiments wherein the drive motor is laterally displaced from the axis of the control rod. This might be desirable in the case of research type reactors wherein, for example, it might be desirable to facilitate changing gear ratios between the motor rotor and the rod movement producing means; or to facilitate change of the pitch of the rod movement producing thread element. Accordingly, we have herein disclosed embodiments incorporating certain of our inventive features, in units wherein the axis of the drive motor is laterally displaced from the axis of the rod. These will be described fully hereinafter.

It is also noted that with such laterally displaced motor type of arrangement it is possible to bring the center to center spacings of the control rods to small values such as 2.50″–3.00″ already referred to, by staggering the laterally displaced motor portions of the units in the spatial arrangement of the reactor drives.

It is also noted that we have, in such laterally displaced embodiments so designed and arranged the motor elements and the gearing, etc., that all such parts comprise a unitary ensemble, and can be treated as such in mounting the units over the reactor pile. Thus, for example, there is avoided the need of mounting the gear trains for the rod drives on the bridge which extends across a "swimming pool" type reactor of conventional design.

Another feature of our present invention concerns itself with the combination of a "stepping" type motor with the control rod movement producing means. Such stepping type motors are so designed and constructed that successive impulses of current delivered to their coils produce successive equal increments of angular advance of the rotor in a selected direction with positive control of such advances. Thus the total angular advance of the rotor (and of the driven mechanism (herein the gear train and the rod movement producing means) is accurately and positively controlled and definitely known to an attendant operating the controls for the reactor rods; or, in the case of an automatic control system, there is exact and accurate production of the intended rod movements, even from a distance or through a selected form of remote control. In connection with the combination and use of such stepping type motors with the control rod movement producing means, the following comments are also pertinent:

Conventional forms of such stepping motors, are provided with a large number of stator teeth of the field element, and with corresponding number of teeth on each section of the rotor, so that as each impulse of current is delivered to one of three stator coils the rotor is advanced angularly an amount equal to one-third of the angle between successive teeth of either the rotor or the stator (both having the same number of teeth). Thus, in the case of a stator (and rotor) design having 30 teeth on each rotor and each stator element, there must be delivered ninety pulses to the stator coils (thirty to each such coil and in proper succession of the coils), for each rotation of the rotor, corresponding to 4 degrees of rotor advance per pulse, or step. Thus, with an arrangement embodying 8 turns per inch of a worm drive to the rod movement producing means there would be a rod movement of only 0.0014″ per step or impulse; and with a gear ratio of ten to one between the rotor and such worm drive, there would be only 0.00014″ per step or impulse. Thus it is seen that an extremely accurate and closely controlled movement of the control rod is assured by use of such type of stepping motor drive. Thus, too, the actual rate of rod movement may be made as large as desired by correspondingly rapid delivery of the pulses to the motor coils. It is possible to operate such stepping type motors with control assurance with pulse frequencies as high as several thousand per second, so it is possible to produce the desired speeds of control rod movement even when using such speed reductions as suggested earlier in this paragraph. The following comments respecting the use of such stepping type motors for the present combinations are also pertinent:

Since high pulse rates may be used with such stepping type motors, it is possible to use a large number of teeth in the rotor and stator sections of the motor so that a correspondingly small angular advance is produced per pulse. Due to this condition it is possible to design and construct such a motor to produce a high starting torque in a small size, and in comparison to such size. Then by using a large gear reduction between the rotor of the motor and the rod advancement producing means it is possible to produce the needed pull for raising the rod on the rising phase of the operation. These effects are produced in combination with the ability to produce the desired rate of rise, keeping in mind that usually a comparatively low rising rate is desired since the rising movement increases the rate of the reaction. When it is realized that some commercial type rods weigh, with the necessary gripping and ancillary elements several hundreds of pounds it will be realized that the stepping motor type drive is peculiarly adapted to meet the requirements imposed by reactor rod control operations.

In the design and construction of such control rod installations it is also possible to design and produce the worm drive between the rod carrier itself and the gearing from the motor of such pitch that such worm drive is not self-locking but is reversible—that is, when the motor drive connection is ineffective for rod raising and when no other braking operation is produced, the weight of the rod and connected parts is sufficient to cause the rod to descend without power drive from the motor. Thus, as a safety feature the design, using the stepping type motor, may be such that on occasions of emergency the control rods may be quickly shifted to their full down positions by merely releasing them from restraint either imposed by the motor or by reason of the nature of the gearing connecting the rotor of the motor to the rod carrying elements.

Additionally, such stepping type motors lend themselves admirably to parallel operation of a group of motors controlling corresponding individual rods. With such an arrangement each pulse delivered to the stators of all such motors will actuate all of the rotors by exactly equal amounts of angular movement, with corresponding assurance that all of the control rods are at all times in exactly synchronized positions in the reactor pile. Thus the required equality or proportionate movement of the various rods of the reactor pile is ensured, meeting a critical condition in the safe and proper operation of such energy producing units.

Also, such stepping motors lend themselves admirably to use with various kinds and designs of control circuit arrangements, and methods of control of the motors, either singly or in parallel grouping of the motors. In the case of reactors intended for experimental use this allows a wide range of such experimental uses without change in the basic rod control mechanism. In the case of power producing reactors, this allows use of a program of use of the rod drives as a function of load level, fuel burnout, or variation of temperatures, etc., within the core of the pile.

It is also noted that such stepping type motors may be designed and built with bobbin wound type coils instead of skein wound coils such as are needed in motors of types which must use slotted armatures to receive such windings. Due to this circumstance it is possible to wind the bobbin type coils for the stators of such stepping type motors with anodized aluminum wire encased in ceramic material, which type of wire and its insulation and protection cannot possibly be used in conventional types of motors. Thus, due to this circumstance, all parts of such stepping type motors may be easily and simply protected against environmental effects imposed by the use of such motors in or near reactors, such effects including corrosive fluids, high temperatures, and above all, high energy nuclear radiation. Conventional motors with conventional windings cannot be adequately protected against such damaging environmental conditions. Also, both the rotor and stator elements can be plated, and, if necessary, constructed of materials such as the magnetic steels, stainless steels, or ceramics.

Other features and objects of the invention concern themselves with various methods of control of the reactor rods through the instrumentality of the stepping type motors, in particular. These methods are schematically shown in various of the figures to be hereinafter described.

Other objects and uses of the invention will appear from a detailed description of the same, which consists in the features of construction and combinations of parts hereinafter described and claimed.

Figure 2:
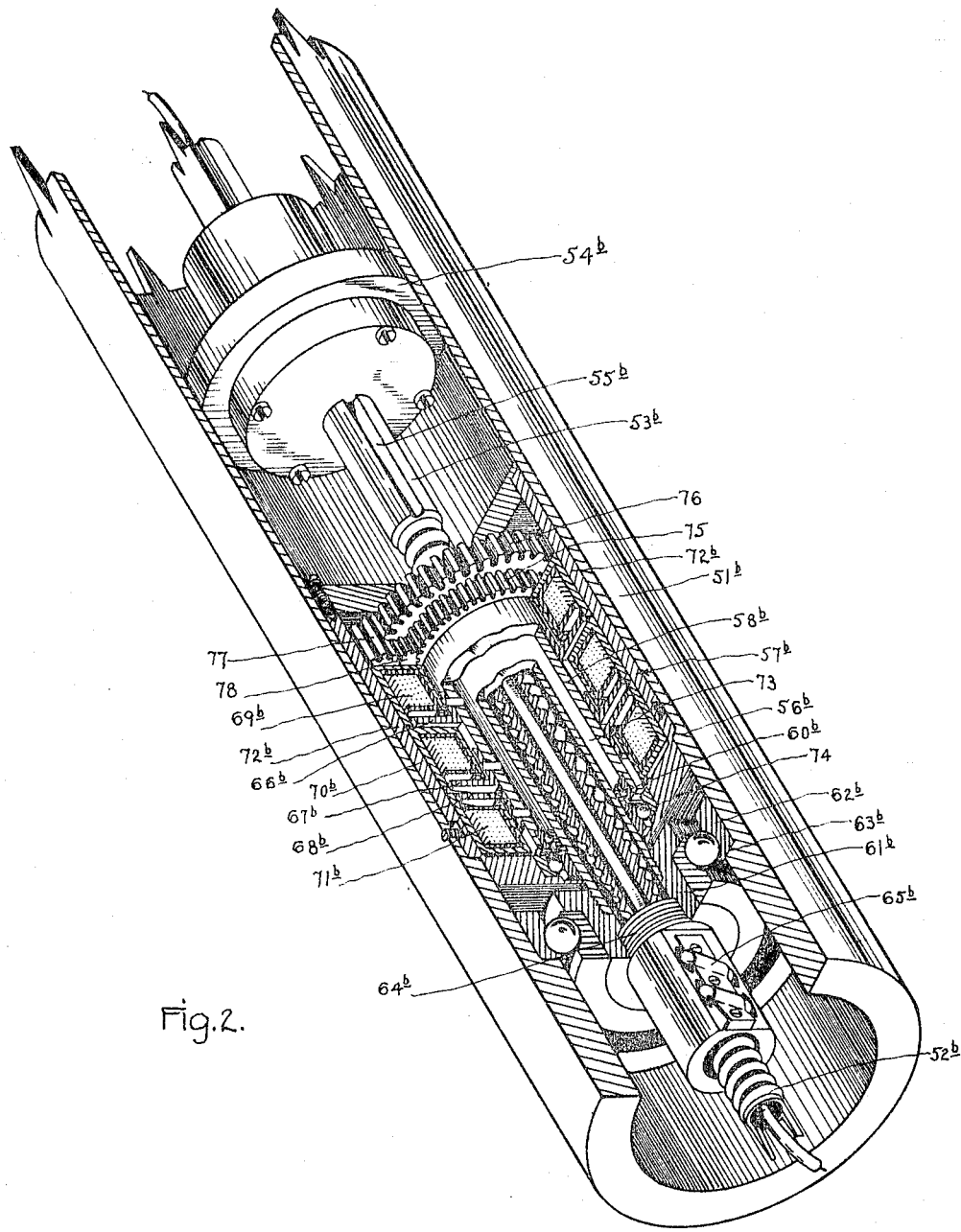

In the drawings:

FIGURE 1 shows a cutaway perspective view of a reactor control rod actuating unit of simple form embodying the features of our present invention; and this embodiment incorporates a three section stepping type motor having a hollow shaft through which the worm element which is connected to and supports the control rod passes, together with provision for restraining such worm element against rotation while allowing it to move axially of the motor with freedom under motor drive; all such parts being housed in a simple cylindrical housing of diameter sufficient to accommodate the stator section of the motor;

FIGURE 2 shows a cutaway perspective view of another reactor control rod actuating unit similar to that shown in FIGURE 1; but the present embodiment includes gearing drive connections between the hollow motor shaft and the worm drive of the control rod movement producing element, such gearing drive connections being constituted for drive of the worm of the rod movement producing element in selected direction and at selected gear ratio with respect to the speed of the motor rotor; and in the embodiment illustrated in this figure there is a reversal of direction of the drive to the rod movement producing element and also a reduction of the speed of such rod movement producing element as compared to the speed of the motor rotor;

FIGURE 3 shows a cut-away perspective view of another and third embodiment of control rod actuating unit, also similar to those of FIGURES 1 and 2; but in the present embodiment we have included a clutch element between the motor rotor and the drive to the control rod movement producing element; and specifically such clutch element is included in the gearing elements; such clutch element being of the electromagnetic type which is brought into clutching engagement by energization of its solenoid, which energization may be controlled independently of the supply of current to the motor or harmoniously therewith;

FIGURE 4 shows a fragmentary longitudinal section taken substantially on the line 4—4 of FIGURE 3, looking in the direction of the arrows, and on enlarged scale as compared to FIGURE 3;

FIGURE 5 shows a cutaway perspective of another and fourth embodiment of control rod actuating unit, also similar to those of FIGURES 1, 2 and 3; but in this embodiment we have provided two sets of gear drives between the motor rotor and the drive to the control rod movement producing element, both of such illustrated gear drives being constituted for drive of the control rod movement production element in the same direction for unchanged direction of motor operation; and the two sets of gear drives being constituted for producing different speed ratios between the motor rotor and the control rod movement producing element; and by providing electrical controls for production of motor reversal this embodiment may be used for drive of the control rod movement producing element at either of the rotative directions, and at either of the two speeds; and this embodiment includes a clutch element between the motor rotor and the drive to the control rod movement producing element for each such gear drive element so that either of the gear drive elements may be brought into service for drive; or by energizing both of the clutches simultaneously the parts will be locked against rotation;

FIGURE 5A shows, in longitudinal section, an embodiment the same as that shown in perspective in FIGURE 5; but in FIGURE 5A we have also shown the connection of the control rod to the screw-threaded shaft, by means of an electromagnetic clutch, the supply lines to such clutch extending up through the hollow screw-threaded shaft to its upper end for connection to the proper current supply lines, and control elements. Simple electrical connections for supply of the pulses to the motor coils are also shown, and suitable supply lines for supply of current to the clutches are shown with simple switching means to control the clutching operations.

Figure 7:
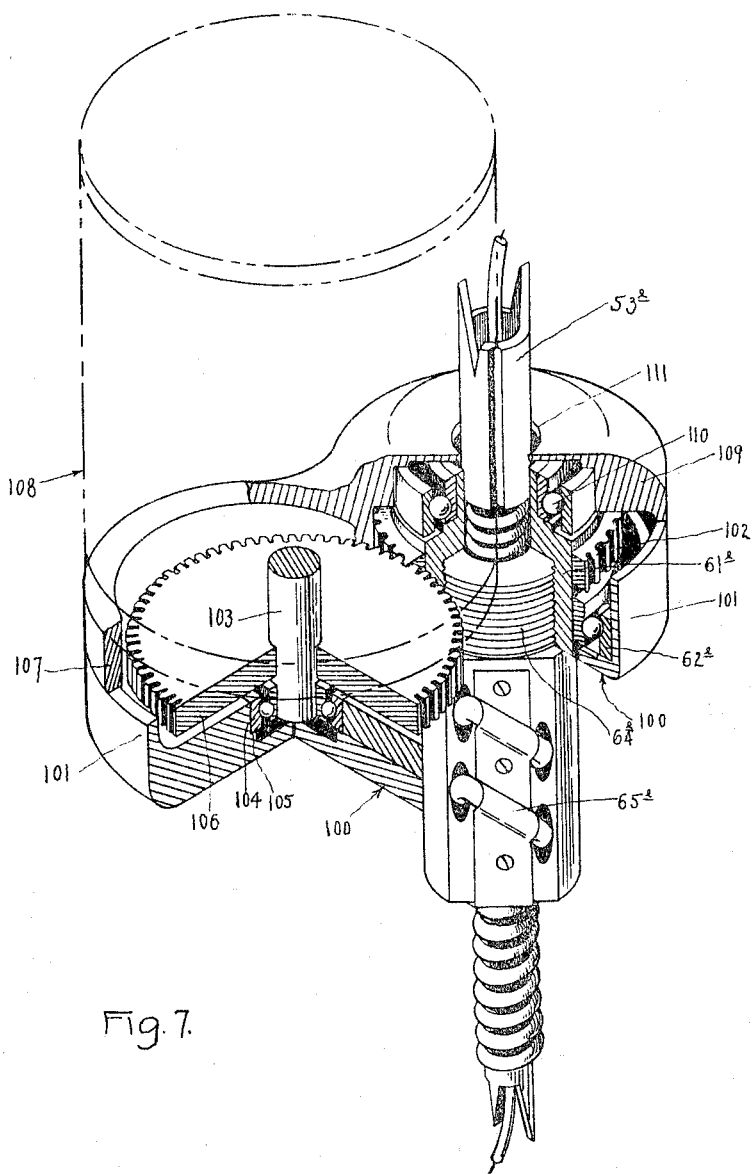
Figure 8:
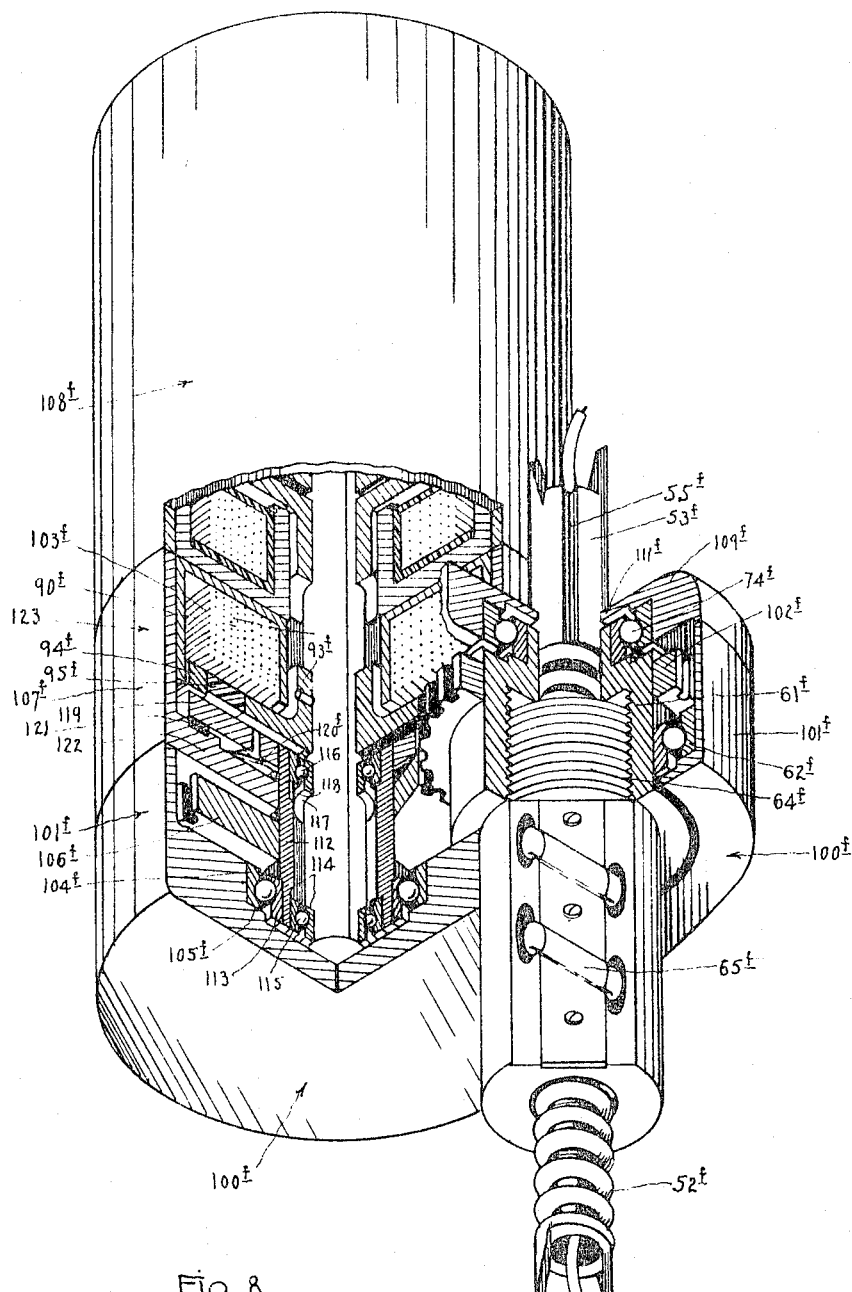

FIGURE 6 shows a fragmentary cross section taken substantially on the line 6—6 of FIGURE 5, looking in the direction of the arrows, and on enlarged scale as compared to FIGURE 5; and this figure shows a modification of the embodiment shown in FIGURE 5, comprising the provision of a pawl ratcheting with one of the gears which is attached to the motor rotor shaft to positively prevent reverse rotation of the rotor, one of the gear drives between the motor rotor and the control rod movement producing element including an extra gear to produce reverse drive of such control rod movement producing element without reversal of the motor rotor;

FIGURE 7 shows a cutaway perspective of another and fifth embodiment of the control rod movement producing unit, also embodying the use of a motor of the stepping or other type, preferably a reversing motor; and in this embodiment the motor and the drive end of the gear connection from the motor shaft to the control rod movement producing element are enclosed in a housing laterally displaced from the axis of the control rod and supported by or connected to the control rod housing element;

FIGURE 8 shows a cutaway perspective of another and sixth embodiment of the control rod movement producing unit, also embodying the use of a motor of the stepping or other type, preferably a reversing motor; and this embodiment includes a clutch element movable between a motor drive connection position and a non-rotative or locking position, such clutch element being carried by one of the gear elements which is in connection with the control rod movement producing element, so that with such clutch element in one position the driving connection between the motor rotor and the control rod movement producing element is established, whereas when such clutch element is in its other position such driving connection between the motor rotor and the control rod movement producing element is broken and a locking engagement is established between such clutch element and a stationary element to thus lock the control rod movement producing against movement through the medium of the gear connection parts, such clutch element being normally spring shifted to such locking position so that whenever there is no current on the solenoid which actuates such clutch the control rod movement producing element is locked against movement;

FIGURE 9 shows a cut-away perspective of another and seventh embodiment of the control rod movement producing unit, also embodying the use of a motor of the stepping or other type, preferably a reversing motor; and this embodiment includes two gear drive connections between the motor rotor and the control rod movement producing element, together with a clutch to engage either such gear drive to the driving end of such gear drive connection, the two gear drive connections being of different ratios of drive to the control rod movement producing element so that selection of drive ratio may be made by energization of the proper clutch element; and by use of the present embodiment of control rod movement producing unit, or the equivalent thereof, with a proper control circuit, this unit map be used to provide a two-speed floating control to allow a high speed of control rod movement until within a pre-selected distance of balance of the reactor rate of reaction, and then providing for a slow rate of approach to the balance point of such reaction, thus preventing overshoot;

FIGURE 10 shows a perspective external view of the unit shown in FIGURE 9, but showing the motor element in phantom for purpose of better showing other elements;

FIGURE 11 shows a fragmentary longitudinal section through the motor rotor shaft and the two clutch elements and the two gear drive elements between the motor shaft and the control rod movement producing element; and this view is a section similar to that shown in FIGURE 9, but is a direct section at right angles to the clutch elements, and better shows the construction than is shown in FIGURE 9; and this section also shows more clearly than FIGURE 9 the two gear drive elements of different ratios and also shows the two clutch elements in section; being on smaller scale than FIGURE 9.

Referring first to FIGURE 1, the same shows in cutaway fashion a control rod movement and controlling unit of simple form embodying our invention. The principal elements of this unit are housed in a cylindrical enclosure 51 which may be conveniently supported in vertical position above the reactor at the location assigned to the control rod which is controlled by this unit. The upper end portion of such enclosure is shown broken away for convenience, but need not extend higher than the broken section shown in the figure. The control rod itself, and the clutch (electromagnetic by convenience) by which the worm screw presently to be described is connected to such control rod, are not shown in this figure, but it will be understood that the worm screw connects, either directly or through such clutch or other connection, to the control rod itself. Such control rod and electromagnetic clutch elements are shown in FIGURE 5A, to be hereinafter described. The worm screw is designated by the numeral 52. It is preferably hollow as shown to accommodate the clutch control wires which extend from a suitable control unit (not shown) above the unit now being described, to the clutch which is connected to the lower end of the worm screw.

The threaded or screw portion of the worm screw is of length to take care of the full vertical movements of the control rod between its fully lowered and fully raised positions. The upper portion 53 of such worm screw rod is unthreaded and works nicely through the supporting element 54 which is set into the cylindrical housing and secured in place therein by suitable securing means (not shown). The unthreaded portion 53 of the worm screw element is splined or keyed as shown at 55, and a ball-bearing spline element carried by the element 54 engages such spline 55 to prevent rotation of the worm screw element while permitting free vertical movements thereof. The details of construction of such ball-bearing spline element are not shown as such devices are conventionally used, and are well known in the arts.

The drive motor is set into the cylindrical housing and its position is vertically located by seating down against the shoulder 56 provided on the inside surface of the cylindrical housing. We have herein shown such motor as being of the stepping type, and provided with three stator windings or coils which is a construction known in the motor arts. The motor shown in FIGURE 1 is designated by the numeral 57, but it will be understood that, except insofar as special forms of motors and special designs of such forms, are specially adapted to meet the requirements of reactor control rods, other forms of motors might be substituted for that specifically shown in FIGURE 1.

The motor is provided with a hollow shaft 58 through which extends the worm screw for free axial movement with respect to the motor. The upper end of such hollow shaft is journalled to the upper end of the motor body by the ball bearing 59, and is also journalled to the lower end of the motor body by the ball bearing 60, and such lower end portion of such hollow shaft extends below the lower end of the motor and is threaded or otherwise connected into a ball thrust type bearing element 61, whose outer raceway 62 seats against an upwardly facing shoulder 63 of the cylindrical housing. A nut element 64 is threaded into such bearing element 61 and carries a re-circulating ball bearing which meshes with the worm threads so that rotation of the nut element 64 produced by rotation of the motor shaft also produces rotation of such re-circulating ball bearing element with respect to the worm screw, which latter is retained against rotation by the spline connection 55 already referred to. The recirculating ball bearing element is shown in perspective in FIGURE 1 where it is identified by the numeral 65. Units of this type are well known in the arts.

It is now apparent that rotation of the hollow motor shaft in either direction will produce a raising or a lowering of the screw-threaded element 52, and the amount of such raising or lowering movement of such element 52 per rotation of the hollow shaft 58 will depend on the pitch of the screw-thread of such element 52 (which is single-threaded in the embodiment shown in the figure).

The rotor of the motor includes three rotor elements 66, 67 and 68, the perimeters of which elements are provided with equally angularly spaced teeth; and the stator of such motor includes three stator elements, each of which is provided with perimetral teeth to correspond to the teeth of the matching rotor element. Forms of such motors are disclosed in Letters Patent of the United States, No. 3,005,118, issued October 17, 1961, to Agnes J. Ranseen, as the executrix of the state of Emil L. Ranseen, inventor, deceased. Other forms of such motors are also well known in the arts. Each stator element includes an energizing coil, such coils being shown at 69, 70 and 71 in FIGURE 1. The teeth of the three rotor elements 66, 67 and 68, and the teeth of the matching stator field elements are so positioned radially about the motor axis that the teeth of one rotor element come into registry with the teeth of the corresponding stator section at one position of rotation of the rotor, then the teeth of the next rotor element come into registry with the teeth of its stator section, and then the teeth of the third rotor element come into registry with the teeth of the corresponding stator section, with repetition of such conditions of successive registry of rotor and stator section teeth as the rotor rotation continues. These successive registrations are produced by successive energizations of the three stator coils, and the direction of shaft rotation will depend on the sequence of such registrations of the rotor and stator teeth and energizations of the respective stator coils. Thus, if the three stator coils be designated "A," "B," and "C," as shown in FIGURE 1 and if they be energized in the sequence "A," "B," "C," "A," etc., the direction of rotation will be, say clockwise, whereas if the sequence be made "A," "C," "B," "A," etc., the direction of rotation will be reversed. Thus, with such stepping type motors, of three section form, they may be rotated in either direction by mere reversal of the sequence of pulses delivered to the stator coils of such motor, thus providing a very simple means of determining the direction of motor rotation and also the direction of control rod drive.

The motor housing, being the cylindrical casing 72 within which the stator sections are seated, may be secured against rotation in the cylindrical housing 51 in suitable manner as by the stud or studs 73 extended through the housing 51 and into engagement with such motor housing element 72. The connections to the several stator coils of the motor may be conveniently run down through the cylindrical housing 51 from its upper end.

Briefly re-stated, the embodiment shown in FIGURE 1 consists of a drive motor, preferably but not necessarily, of the stepping type, having a hollow shaft, a worm nut driven by such shaft, a thrust bearing for such worm nut, the worm screw threaded through such nut, and means to restrain the worm screw against rotation with the nut, while allowing free axial movement of such worm screw according to the pitch of the threading. Evidently with a sufficiently large pitch the worm screw could descend by gravity when the proper releasing operations are performed. Also, by using a practically frictionless ball connection between the worm screw and the nut, the former might be free-descending with comparatively small pitch designs. However, in order to allow rapid descent of the control rod under emergency conditions, such control rod should be disconnected from the gearing and/or rotor to enable such control rod to fall free and substantially without need of overcoming rotational or linear inertia of other parts than its own body. To enable such operation a clutch may be included between the control rod and such inertia producing other parts so that, by releasing such clutch the control rod may descend with a substantially free fall, except as restrained by friction of engaging elements. Such emergency conditions might include failure of electrical power supply or the like. It is also noted that conventional designs of reactors include substantially gas tight enclosures for the reactor pile and the control rods proper, with the connections to such control rods extending up through tight packed joints, the lower portions of such connections extending through such jacked joints, the control rods proper never rising above or through the housing proper. Such tight packed joints produce considerable frictional resistance to axial movements of the elements which extend through them, so it will generally be found necessary to effect drive down as well as up, by motor power.

Considering next the embodiment shown in FIGURE 2, various of the parts included therein correspond to like parts of the embodiment shown in FIGURE 1. Such so corresponding parts are therefore numbered the same as in the first embodiment, but with the suffix "b" for identification. Repetitive description of such parts is therefore unnecessary, except as additional features of the embodiment of FIGURE 2 may make such further description necessary or desirable.

In the embodiment of FIGURE 2 the motor shaft, still hollow as before, is of size sufficient to accommodate a second hollow shaft or tube 73 within it. Such internal hollow shaft is journalled at top and bottom to the motor housing, only the lower such journal showing in FIGURE 2 as 74; and the outer hollow shaft, being the actual shaft of the motor, is then journalled to this inner hollow shaft instead of being journalled directly to the motor housing as before. This fact is indicated by the journalling of the lower portion of the motor shaft $58^b$ on such additional hollow shaft as shown by the journal $60^b$. Such inner hollow shaft 73 is then threaded to the element $61^b$ which carries the nut element $64^b$, so that in the present embodiment the drive of such nut element is effected by the inner hollow shaft 73 and not directly by the outer or motor shaft itself.

A gear drive connection is effected from the outer hollow shaft $58^b$ (being the motor shaft) to such inner hollow shaft 73, such gear drive being conveniently effected at the upper end of the motor. In the detailed embodiment shown in FIGURE 2 such gear drive is located as above for convenience of assembly and other reasons. It includes the gear 75 secured to the outer hollow shaft or motor shaft, the gear 76 secured to the inner hollow shaft, and at least one gear engaging both such two gears, and shown at 77 in FIGURE 2. When both of the gears are of the same size such intermediate gear 77 may have its teeth extending across both such gears 75 and 76 and meshing with both of them, and producing a one to one gear drive from the motor shaft to the inner hollow shaft; or such gear element 77 may be split into two sections, one meshing with each of the gears 75 and 76, and such gears 75 and 76 being of different pitch diameters, as shown in FIGURE 2, with the two sections of such gear element 77 of different pitch diameters to match the corresponding gears 75 and 76, thus producing a gear ratio other than one to one between such gears 75 and 76; but in either such case the two hollow shafts $58^b$ and 73 would rotate in the same direction. In the embodiment specifically shown in FIGURE 2, however, we have included an idler gear 78 between the gear 75 and the gear element 77. With such arrangement the two gears 75 and 76 will rotate in opposite directions. Both of the gear elements 77 and 78 are suitably journalled to the housing of the motor or other element on stationary or non-planetary journals.

It is noted that with this arrangement of FIGURE 2 it is possible to provide for drive of the worm shaft (the inner one, 73) either slower or faster than the drive of the motor shaft, thus allowing for much flexibility of design, and use of a given design for various specifications of rate of control rod movement with a given motor specification and frequency of applied pulses to its coils.

Considering next the embodiment shown in FIGURE 3, various of the parts included therein correspond to like parts of the embodiment of FIGURE 2, and also that of FIGURE 1. Such so corresponding parts are therefore numbered the same as in the previous embodiments, but with the suffix "c" for identification. Repetitive description of such parts is therefore unnecessary except as additional features of the embodiments of FIGURES 2 and 1 may make such further description necessary or desirable.

The embodiment of FIGURE 3 corresponds to that of FIGURE 2 as respects the provision of the two hollow shafts, one within the other, and the outer one being the motor shaft. It also corresponds to the embodiment of FIGURE 2 insofar as respects the provision of the gear element secured to the upper end of such motor shaft is concerned. In the case of FIGURE 3, however, the gear element to which such motor shaft gear is drivingly connected (for drive of the inner or worm nut element) is not directly connected to such inner shaft element, but a clutch is interposed between such gear and said inner shaft to permit control of drive of the worm screw and control rod by means additional to starting and stopping the motor itself. Also, by unclutching such clutch the worm screw is freed from positive connection to the gearing and the rotor of the motor so that, in case of gravity produced descent of the control rod such descent is not interfered with or slowed down by need of driving such gear elements and motor rotor, with corresponding faster descent under emergency conditions. Accordingly, the following elements are provided in the embodiment of FIGURE 3:

A gear 76c is rotatably and slightly movably mounted on the outer raceway of the ball bearing 78 of which the inner raceway is set onto the inner hollow shaft 73c, such inner raceway preferably being positioned against rise on the said hollow shaft by a conventional spring ring retainer 79 as shown in FIGURE 4. Conveniently such mounting of such gear is not a direct mount, but an annulus 80 is set onto the outer raceway, being provided with a shouldered portion 81 on its lower face to engage the lower edge of such inner raceway as shown in FIGURE 4. A bearing metal element 82 is set onto the outer raceway and the gear element 76c is then set onto such bearing metal element. A disk spring 83 of conventional design is set onto the flange 84 of the element 80 and locked in place by a spring ring 85. The peripheral portion of such disk spring engages the heads of a number of pins 86 which are secured to the gear element 76c, such disk spring then urging the gear element rightwardly of FIGURE 4, being in downward direction when the unit is installed for use. Nevertheless such gear element can be drawn leftwardly or upwardly, sliding on the element 80, and deflecting the disk spring correspondingly.

The gear elements 75c and 76c are geared together by suitable intermediate gear elements 78c. In the showing of FIGURES 3 and 4 we have provided the two gear elements 78c and 77c corresponding to like gear elements 78 and 77 of FIGURE 2. Thus motor drive necessarily results in drive of such gear element 76c in one direction or the other according to direction of motor rotation.

Directly above the gear elements so far described we have provided a clutch element of more or less conventional design, including the following:

A stator field element 87 is secured to the upper end of the motor casing 72c or other stationary element such as the cylindrical housing 51c. The upper portion of the inner hollow shaft is journalled by a ball bearing 88c set into a disk like element 89 which is seated into and against the upper end of such motor casing. Thus such upper end of the inner hollow shaft, which drives the threaded nut 64c is well supported at its upper end. Such field element 87 is provided with a downwardly facing open annular recess within which is seated an exciting coil 90. When such coil is energized the flux thus produced appears as a north pole at one of the field element flanges 91 or 92, and as a south pole at the other of such flanges. A flanged element 93 of magnetic material is secured to the hollow shaft 73c with its upper face in close proximity to but not in actual engagement with the smaller radius flange 92 of the field element. A ring of magnetic material 94 is secured to such flanged element by an intermediate annulus 95 of non-magnetic material, so that such magnetic material ring 94 is also secured to the hollow shaft 73c but is insulated magnetically therefrom.

The gear element 76c is formed of magnetic material, and when shifted downwardly by the disk spring element its upper annular surface is separated from the magnetic ring 94 by only a slight air-gap of one or a few thousandths of an inch, sufficient to ensure free running between the parts and to ensure breaking of physical contact between the parts. The radial dimension of the gear element (magnetic) 76c is sufficient to span the radial dimension of the annulus 95 of non-magnetic material, so that upon energizing the coil 90 the flux flows from one of the flanges 92 or 91 across a short air-gap to the magnetic annulus of the element 93 which is rotatable with respect to the stationary field of the clutch, through the flange of such element 93, across another short air-gap to the small radius portion of the annular gear element 76c, radially outwardly through such gear element, across another short air-gap to the ring 94 of magnetic material, across another short air-gap to the other flange 91 or 92 of the clutch field element, thus defining the magnetic path so produced. The direction of flux travel as above defined is of course dependent on the direction of current flow through the coil 90, but the magnetic effect will be as above explained for either direction of such current flow.

The gear tooth faces of the gear element 76c and of the meshing gear 77c are made of width sufficient to take care of the slight axial shift of such gear element 76c without unmeshing such gears, so that they remain in mesh at all times. Since the field element 87 of such clutch is stationary it is possible to make the necessary electrical connections to the coil 90 without need of using slip-rings or like elements.

With the embodiment thus described for FIGURES 3 and 4 it is possible to connect the control rod movement producing element to the gearing by a simple electrical operation; but it is especially noted that with this arrangement the control rod movement producing element is normally completely disconnected from all of the gearing so that in emergencies when it is desired to allow such control rod to make a fast descent no unnecessary inertia due to various otherwise connected parts need be overcome, and a gravity descent may thus be allowed with a minimum interference. On the other hand, should it be desired to positively drive the control rod down such operation is conveniently effected merely by energizing the clutch and delivering the pulses to the motor stator coils in proper sequential direction. Up movement of the control rod is of course effected by reversal of such pulse sequence delivery.

Considering next the embodiment shown in FIGURE 5, various of the parts included therein correspond to like parts of the embodiments of FIGURES 2 and 3, and also that of FIGURE 1. Such so corresponding parts are therefore numbered the same as in the previous embodiments, but with the suffix "d" for identification. Repetitive description of such parts is therefore unnecessary except as additional features of the embodiment of FIGURE 5 may make such further description necessary or desirable.

The embodiment of FIGURE 5 is substantially the same as that of FIGURE 3 insofar as it incorporates the gear drive and clutch features between the drive motor and one end of the shaft 73$^d$ (corresponding to 73$^c$ in FIGURE 3) is concerned. This is the shaft which carries the threaded nut element which engages the screw-threaded element 52$^d$ (52$^c$ in FIGURE 3). Thus, the present embodiment of FIGURE 5 incorporates a gear drive and clutch arrangement between the upper end of the motor shaft and the proximate portion of the inner hollow shaft 73$^d$ of the same design as that already described in connection with FIGURE 3 embodiment.

Additionally, we have, in the embodiment of FIGURE 5 included a similar gear drive and clutch structure between the motor shaft 58$^d$ and such inner hollow shaft 73d of the same overall design as that already described for the upper end of the structure of FIGURE 3 (being also the same as that at the upper end of the structure of FIGURE 5), such additional gear drive and clutch arrangement of FIGURE 5 being located between the lower portion of the motor shaft 58$^d$ and the lower portion of the shaft 73$^d$. The elements of such additional and lower located gear drive and clutch drive are conveniently numbered the same as like elements of the gear drive and clutch drive located at the upper portion of the structure, but with the provision of the further suffix ', such as 90$^{d'}$. Thus it is unnecessary to describe this second and lower placed gear drive and clutch arrangement in detail.

It is noted that with the arrangement just described the direction of rotation of the screw-threaded element 52$^d$ will be the same whether the upper or the lower clutch be engaged (assuming that the direction of motor rotation remains unchanged, the sequence of pulsing remaining unchanged). However, the direction of motor rotation may, for either condition of clutch use, be produced in either direction by reversal of sequence of pulsing. Thus, by providing two different gear ratios at the upper and lower ends of the structure, and by providing for reversal of the motor supplied pulses (by change of sequence of pulse delivery to the three coils of the motor stator, as already explained, the screw-threaded shaft 52$^d$ may be driven at either of two speeds in either the up or down drive direction, as selected. Such an arrangement may be desirable for use in connection with certain forms of automatic control. Also, by energizing both of the clutches at the same time the shaft will be mechanically locked in position.

It is understood that with the foregoing arrangement the direction of drive of the shaft 52$d$ will be the same when either the upper or the lower clutch is engaged for drive at the corresponding end of the unit, provided the direction of motor rotation is the same in both cases, only the gear ratio between the motor shaft and the shaft 52$^d$ being changed. Thus, with such an arrangement, reversal of direction of the shaft 52$^d$ must be produced by reversal of motor shaft direction.

It may sometimes be desired to provide for change of gear ratio of drive from the motor shaft to the shaft 52$^d$ to enable selection of either of two gear ratios during down movements of the control rod, which is the direction for reduction of reactivity of the pile. The so-far-described arrangement enables production of such choice of gear ratio to meet a selected operating condition. However, direction of rotation of the shaft 52$d$, with such arrangement, can be effected only by reversal of motor shaft direction by change of the sequence of pulses delivered to the stator coils.

Usually, it is not only desirable but imperative that the raising of the control rods be effected slowly, since such raising increases the reactivity of the pile, and, if overrun, might produce a runaway condition in the reactor. It is thus evident that, should the combination of fast shaft drive ratio and motor direction for raising the control rod be produced, fast control rod raising would occur. Such a condition might be produced through inadvertence or through faulty electrical connections, or otherwise. To ensure against such a possible condition, and for other reasons, the modification of FIGURE 5 shown in FIGURE 6 may be used. This modification is as follows:

With a two pinion gear connection from the motor shaft to the shaft 52$^d$ (as shown in FIGURE 5, particularly at the upper end thereof), the rotation of the shaft 52$^d$ is opposite to that of the motor shaft, whether the gear ratios at the upper and lower ends of the structure be the same or different. The showing of FIGURE 5 includes provision for different ratios as already explained. It is thus evident that with the so-far-disclosed arrangement of FIGURE 5 embodiment, the control rod might be raised either slow or fast, merely by reversing the motor and selecting or operating the proper clutch for producing such slow or fast movement of the control rod. This would make possible a very dangerous pile operating condition since it would make possible fast raising of the control rod, as already referred to in the previous paragraph. To positively prevent any such dangerous operating condition, and for other reasons the following provision is shown in the modification shown in FIGURE 6, as follows:

In the modification of FIGURE 6 we have included an extra pinion element 96 between the motor shaft gear 75$^d$ (or the pinion 78$^d$) and the pinion 77$^d$, only at one end of the structure, such as the lower end at the location of the clutch element 94$^{d'}$. Thus the desired reversal of direction of the shaft 52$^d$ may be secured by energizing either the upper or the lower clutch element as selected without need of reversing motor direction, and the motor may now be always operated by the same sequence of stator coil energizations, regardless of desired direction of control rod movement—either up or down. We have, then, provided means to positively lock the motor shaft against reversal of its rotative direction, so that it cannot be rotated reversely even in case of an error of wiring or other accidental wrong installation or connection of elements. In the showing of FIGURE 6 such locking of the motor shaft against reversal of direction, and to ensure only unidirectional motor rotation, we have included the spring pressed pawl 97 pivoted to a stationary part at the point 98 and normally pressed into engagement with the teeth of the gear 75$^d$ by the spring 99. Such pawl permits motor rotation in the desired and proper direction, but prevents rotation in the reverse or improper direction. The arrow shown on the gear 75$^d$ of FIGURE 6 shows the permitted direction of rotation of such gear (being also the rotative direction of the motor rotor and shaft). If the extra gear 96 is included in the upper gear drive element (as indicated in FIGURE 5), and produces the low speed drive of the shaft 52$^d$, and if such gear drive at the upper end of the unit acts on the screw-threaded shaft to produce up movement of the control rod when its clutch is engaged, it is seen that energization of such clutch can produce only slow raising of the control rod. Then, when it is desired to lower the control rod by power drive, the upper clutch element will be unclutched, and the lower clutch element will be clutched, thus transferring the drive of the control rod to such lower clutch element. Then, due to the fact that the lower gear drive element is constituted for faster control rod drive than is the upper gear drive element, and due to the fact that such lower gear element drives the control rod at faster rate than does the upper gear element (for an unchanged speed of the motor) it is evident that fast lowering of the control rod may be produced by merely energizing the lower clutch element, the upper clutch element being now non-energized.

Each of the foregoing four general embodiments of our present invention includes a stepping type motor as power delivering element, together with the screw-threaded shaft extending axially through such motor's shaft and driving a threaded nut through which is threaded a non-rotatable shaft to which the control rod is connected, either by a clutch or otherwise. These embodiments also include geared drives from the motor shaft to such nut driving shaft, together, in some cases, with clutch means to control the driving connections between the motor shaft and such nut driving shaft. Each such embodiment thus comprises a unit whose radial dimension is only slightly greater than that of the stator element of such motor, the geared connections and clutches, when provided, being located endwise of the motor and without increase of overall radius.

FIGURE 5A shows a structure the same as that shown in FIGURE 5, but in longitudinal section and on larger scale than FIGURE 5; and FIGURE 5A also shows (by the lateral fragmentary portion above the figure number "5A"), the lower portion of the screw-threaded shaft, the upper portion of the control rod, and the intermediate magnetic clutch whose clutching operation is produced and controlled by current supplied through the two lines 305 and 306 which extend from the upper portion 303 of such clutch unit 302, upwardly through the hollow screw-threaded shaft 52$^d$ to suitable current supply and control elements above the motor drive unit proper.

In FIGURE 7 we have shown another modified embodiment of our invention in which the screw-threaded nut and the screw-threaded shaft which carries the control rod, are both driven through suitable gearing (and, in some cases, clutches) by the motor which is located alongside of or laterally displaced from the aforesaid parts, instead of being concentric with them. With such arrangement a more satisfactory version of the invention may be produced for research type control rod controls. This is true, among other things since such arrangement offers flexibility of design not possible in the the concentric element arrangements already described, while still retaining the advantage of compactness and small size. Also the offset motor arrangement presents the possibility of designs in which the gear ratio may be easily changed. Also, since the motor shaft may, in such offset designs be readily uncovered from above, suitable positioning devices may be attached to such shaft, or to the worm gear. Additionally, a more standard design of the motor may be used since the motor shaft is not necessarily hollow, thus reducing costs of construction and assembly.

Due to the drive of such offset type designs, by the stepping type motor, extreme accuracy of rod positioning may be secured, since the motor shaft rotation may be controlled within a single step with certainty, and since any suitable type and ratio of gear reduction may be interposed between the screw-threaded nut and the motor shaft. Thus such designs are especially well adapted for use in research type installations.

In the embodiment shown in FIGURE 7 there is provided a frame element or support member 100 of generally double circular form with the two circles intersecting each other. A flange 101 extends upwardly from the floor of such member to produce a generally cup-shaped unit. The threaded nut element 64$^e$ has its upper neck portion extended freely through the floor of the right-hand portion of the cup, with the upper or neck portion of such nut element threaded securely into the element 61$^e$. Said element 61$^e$ is set into and carried by the inner raceway of the ball-bearing element 62$^e$, the outer raceway of such ball-bearing element resting on and being sustained by the floor of the element 100. Thus, by suitably supporting such element 100 from the frame of the structure above the reactor the control rod and connected elements will be properly sustained.

The element 61$^e$ is provided with the ring gear 102 by which such element is driven. The control rod carrier of screw-threaded shaft 52$^e$ threads through the nut element 64$^e$ which is provided with the recirculating ball bearing drive 65$^e$ as in the previously described embodiments.

The lower portion of the motor shaft 103 is journalled in the floor of the left-hand circular portion of the frame element 100 by the ball-bearing 104. The outer raceway of this ball-bearing is supported by the shoulder 105 formed in such floor, so that the motor shaft and supported parts are well supported without endwise engagement of such shaft with the floor of the frame element. Such motor shaft has secured to it the drive gear 106 which meshes with the gear 102 already described. Conveniently a partially circular spaced element 107 is seated onto that portion of the flange 101 which underlies the drive motor 108, and the motor and such spacer element may be effectively connected to the flange 101 by through bolts or otherwise. If desired such spacer element may comprise a portion of a cap element 109 which houses the upper portion of the elements contained in the right-hand portion of the unit and is secured to the right-hand portion of the flange 101 by suitable bolts or otherwise.

Such cap element provides adequate lateral support for the upper portion of the element 61$^e$, such element extending as a neck portion upwardly into the cap 109 and being journalled at that point by the ball-bearing 110. This ball-bearing also acts to correctly space the element 61$^e$ against vertical displacement upwardly on occasion. The upper splined portion of the screw-threaded shaft element, 53$^e$ extends freely through an opening 111 in the cap 109.

It will be seen that the embodiment thus described and shown in FIGURE 7 comprises a simple design embodying various of the features of the embodiment of FIGURE 1, without the presence of a clutch in either case, and differs from the embodiment of FIGURE 1 primarily in the fact that the drive motor is laterally displaced from the axis of the screw-threaded shaft which carries the control rod elements.

Referring next to the embodiment shown in FIGURE 8, in this case a clutch element has been introduced between the motor shaft and the drive gear. Specifically, this arrangement, as shown, also includes means to brake the drive gear when unclutched from the motor shaft, thus also locking the screw-threaded shaft and the nut to hold the control rod against down movement (or up movement). This embodiment is similar in some respects to that shown in FIGURE 3 which may also be termed a "single clutch" arrangement, with the modification that the motor and gear drive and clutch elements are laterally displaced from the axis of the screw-threaded shaft.

Since various of the elements shown in FIGURE 8 correspond to like elements in FIGURE 3 we shall use like numbering for such elements of FIGURE 8 as used for FIGURE 3, but with the suffix "$f$" for identification; and for like reasons of similarity of structure and function in the two embodiments, we shall not repeat the full description of the embodiment of FIGURE 8, except as seems necessary for proper understanding of parts and functions. A like statement may also apply as respects those elements of the embodiments of FIGURES 7 and 8 which are similar in structure and function.

In the present embodiment of FIGURE 8 the drive gear 106$^f$ which meshes with and drives the gear 102$^f$ connected to the screw-threaded nut element 64$^f$, is carried by a hollow shaft or sleeve 112 which is shiftable axially up or down by a slight amount for reasons to appear presently. To this end the lower end of such sleeve is journalled to the frame element 100$^f$ by the ball-bearing having the outer raceway 104$^f$ seated into a recess in the floor of such frame element. The inner raceway 113 of such ball-bearing then receives the lower end of the hollow shaft 112 with a sliding fit to allow for such vertical movements of such hollow shaft as above referred to. The hollow shaft is provided with the shouldered portions 114 to limit the down movement of the hollow shaft by engagement with the inner raceway 113 already referred to and, if desired, also with the outer raceway of another ball-bearing 115 which is set into the lower end portion of the hollow shaft and serves to give bearing support for the lower end portion of the motor shaft 103$^f$.

Another ball-bearing element 116 is seated between the upper end portion of the hollow shaft 112 and the motor shaft 103$^f$ and serves to retain such shafts in exact coaxial alignment. If the inner raceway 117 of such ball-bearing 116 is secured to the motor shaft non-rotatably, so that such ball-bearing element 116 is fixed in axial position on the motor shaft, the upper end of the hollow shaft 112 may be slightly recessed as shown at 118 to allow for the necessary vertical movements of the hollow shaft during clutching and unclutching operations, presently to be explained. The teeth of the gears 102$^f$ and 106$^f$ are of sufficient face width to ensure good meshing between such gears at all times during the up and down movements of the gear 106$^f$ which is secured to the hollow shaft 112.

The motor 108$^f$ which is shown in FIGURE 8 is of the stepping type, and corresponds to the motor 108 of FIGURE 7, and also to the motor shown in FIGURE 3 (and FIGURE 4 which details the clutch arrangement of that embodiment). Thus, the element 93$^f$–94$^f$–95$^f$ shown in FIGURE 8 corresponds to the element 93–94–95 of FIGURE 3. Such element is magnetized by induction when the stationary coil 90$^f$ is energized, as already explained. Also, such element 93$^f$–94$^f$–95$^f$ is keyed or pinned to the motor shaft and is thus driven thereby. In the present embodiment of FIGURE 8, since the gear element 106$^f$ is displaced to a position low enough to engage the gear 102$^f$, such gear element 106$^f$ is not directly subject to the magnetic flux produced by the energizations of the coil 90$^f$, and does not come into direct driving engagement with the element 93$^f$–94$^f$–95$^f$ when the coil is energized. Accordingly, we have, in the present embodiment of FIGURE 8 provided a separate element 119 which is carried by the hollow shaft 112 in driving manner, and is shiftable vertically slightly up to engage the perimetral portion 94$^f$ when the coil 90$^f$ is energized, to thus produce drive from the motor shaft to the hollow shaft 112, and is shiftable vertically slightly down to permit disengagement of the parts and termination of driving connection between the motor shaft and such hollow shaft 112 when such coil energization is discontinued. The disk spring element 120$^f$ urges the down movement of the element 119 for such disengagement when the coil is non-energized. Such spring element and related parts are similar to like parts shown in the detail of FIGURE 4, and are of like functions. In this connection, however, it is also noted that in the present embodiment of FIGURE 8 such spring element is rather strong so that when the coil is de-energized the downward spring force is sufficient to carry such element down into firm frictional engagement with a friction ring 121 of fiber or the like, seated into an annular recess provided in the upper face of the floor 122 of the spacer element 123, which corresponds, in part, to the spacer element 107 shown in FIGURE 7. Thus, by energizing the coil 90$^f$ such element 119 is disengaged from the friction ring and is brought into driving engagement with the element 94$^f$ drivingly connected to the motor shaft, thus producing drive to the gear 106$^f$; whereas de-energization of the coil 90$^f$ results in freeing such element 94$^f$ from motor drive, with discontinuance of drive of the gear 106$^f$ and immediately produces braking of such element 119 with corresponding locking of the gear 106$^f$ against rotation, and production of the other attendant functions.

It is here noted that with the arrangement thus far described, if the clutch coil 90$^f$ is energized, without corresponding supply of pulses to the motor stator coils, the braking action will be discontinued and the motor rotor will be free to rotate as driven by rotation of the motor shaft by power supplied from without the motor. Thus, with such use of the clutch and the motor coils, it is possible to free the gearing to permit descent of the control rod as a free running gravitational lowered element. By eliminating the friction material annulus 121, so that no braking effect could be produced, de-energization of either the clutch or the motor coils would permit free descent of the control rod under gravitational drive. With such no brake-friction annulus arrangement, de-energization of the clutch would produce complete freeing of clutch engagement with the motor shaft, so that in such case the gear drive would be completely free running without need of spinning the motor rotor, and thus without need of overcoming the rotational inertia of such rotor. Accordingly, such an arrangement would permit much faster acceleration of the descent of the control rod than would the arrangement which includes the function of positively braking the clutch element when such element's coil 90$^f$ is de-energized.

Probably the no-braking arrangement above defined would better meet the requirements for high-level reactors, such as power generators, where serious destruction of life and property might attend a runaway condition of the reactor; whereas, the braking arrangement illustrated would probably better meet the requirements for research and other low-power level reactors, in which it might be desirable to be able to positively hold the control rod against gravitational descent.

It will be understood, in all cases, that other forms of motor than the stepping type may be used, but nevertheless the stepping type presents great advantages and peculiar relationships to the present embodiments, some of which have been previously stated herein.

Referring next to the embodiment shown in FIGURE 9, in this case two gear drives of different ratios are provided between the motor shaft and the screw-threaded nut, together with clutch means for each such gear drive, both gear drives being constituted for drive of the screw-threaded nut in the same direction for a stated direction of rotation of the motor shaft. This arrangement thus presents functional possibilities similar to those possessed by the embodiment shown in FIGURE 5 (not as modified by the showing of FIGURE 6). Furthermore, both such gear drives and corresponding clutches shown in FIGURE 9 are located adjacent to the same end of the drive motor, for convenience in assembly, and to bring both of them into a simple compact co-ordination in which the necessary bearings for the moving parts can be readily given rigid positive support.

Since various of the elements shown in FIGURE 9 correspond to like elements in FIGURE 5 we shall use like numbering for such elements of FIGURE 9 as used for FIGURE 5, but with the suffix "g" for identification; and for like reasons of similarity of structure and function in the two embodiments, we shall not repeat the full description of the embodiment of FIGURE 9, except as seems necessary for proper understanding of parts and functions. A like statement may also apply as respects those elements of the embodiments of FIGURES 8 and 9 which are similar in structure and function.

In the present embodiment of FIGURE 9 the drive gear 106$^g$ which meshes with and drives the gear 102$^g$ connected to the screw-threaded nut element 64$^g$ is carried by a stub shaft 124 which is shiftable axially up or down by a slight amount for reasons presently to appear. To this end the lower end of such stub shaft is journalled in the inner raceway of the ball-bearing 125 received in a recess of the floor of the frame element 100$^g$, such axial shift being effected generally without shift of the ball-bearing itself. The upper end of such stub shaft is of reduced size (as shown in FIGURE 11), and is received and journalled in the lower end of the motor shaft 103$^g$ by the ball-bearing 126 set into a proper recess in such lower end of the motor shaft. Thus such stub shaft is given good support against lateral displacement at both its top and bottom ends.

The gear 102ᵍ, secured to the element 61ᵍ meshes with the gear 106ᵍ so that the screw-threaded nut is driven whenever such gear 106ᵍ is driven. The two gears 106ᵍ and 102ᵍ are provided with tooth faces of sufficient axial dimension to ensure good meshing for both positions of shift of the gear 106ᵍ.

Spaced above the gear 106ᵍ there is provided the short hollow shaft element 127 which is journalled on the motor shaft 103ᵍ by the upper and lower ball-bearing elements 128 and 129, respectively. This arrangement is such as to allow a slight vertical shifting of such hollow shaft element 127 with respect to the motor shaft, either by mounting the hollow shaft itself in slidable manner on the outer raceways or by mounting the inner raceways for slide on the motor shaft. Conveniently, the downward shift of such hollow shaft element 127 is limited by engagement with the upper portion of one of the clutch elements presently to be described. The gear element 130 is secured to such hollow shaft element so that both of these parts shift up and down together. A gear element 131 is secured to the upper portion of the element 61ᵍ in position to mesh with the gear element 130. Conveniently, the gear ratio of such pair of gears, 130–131 is for faster drive of the element 61ᵍ than is the gear ratio of the pair of gears 106ᵍ–102ᵍ, so that by driving through the pair 130–131 the element 61ᵍ is driven faster (for a given motor speed) than when driving through the pair 106ᵍ–102ᵍ. It is then noted that by using such placement of the two pairs of gears the smaller driven gear 131 is brought to the upper portion of such element 61ᵍ which enables a good design of the unit 61ᵍ to be adopted, as shown.

Clutching means are provided between the motor shaft and each of the gear elements 106ᵍ and 130, as follows:

The two clutch elements 132 and 133 are located above the two gears 106ᵍ and 130, respectively. Such clutch elements include their energizing coils 134 and 135, respectively, of the type hereinbefore described. Likewise the elements 93ᵍ and 93ᵍ′ are secured to the motor shaft 103ᵍ and are driven by such shaft. Likewise the armature elements 119ᵍ and 119ᵍ′ are secured to the hollow shaft 127 and to the stub shaft 124, respectively, being shiftable slightly axially into and out of engagement with the corresponding elements 93ᵍ and 93ᵍ′, respectively when the corresponding coils 135 or 134 are energized. Also, spring elements such as shown at 120ᵍ and 120ᵍ′ for the two elements 119ᵍ and 119ᵍ′, respectively, are provided for normally ensuring unclutching when the respective coils are unenergized.

Conveniently the clutch units are seated into the flange portion 136 of the frame element 100ᵍ, or to a suitable spacer element as previously disclosed herein; and the motor unit 108ᵍ is then supported by such flange or otherwise as desired.

It is noted that if desired an idler gear element may be introduced between the gears 106ᵍ and 102ᵍ, or between the gears 130 and 131, to thus enable reverse direction of screw-threaded nut drive when shifted from one pair to the other; and likewise a suitable hold-back element such as the pawl arrangement shown in FIGURE 6 may be provided to ensure against motor rotation in one selected direction, and for purposes such as already explained in connection with the description of FIGURE 6. With the construction as shown in FIGURE 9, and without inclusion of such an idler gear in one train of gears, this embodiment may be used to provide a two-speed floating control for the control rod. This will enable a high speed motion to within a predetermined distance of balance, with a slow rate of approach of the control rod to the pre-determined balance point, and without overshoot.

It is apparent that stepping motor designs are particularly well adapted for the operations of control rods of nuclear reactors, since thereby it is possible to obtain extremely accurate placement of the control rod vertically since a single pulse delivered to the proper stator coil will produce a very small control rod movement, even when the mechanical gear reduction (including that of the screw-threaded nut and shaft arrangement) is comparatively small. This advantage is secured in combination with the assurance of rigid control of the movement, since each such pulse must be accompanied by a corresponding small control rod movement, assuming that a proper factor of torque is contained in the elements as thus designed. Likewise, by merely continuously exciting the stator coil of the last pulse of a series of pulses it is possible to magnetically lock the rotor against rotation, whether or not other locking means are not contained in the control rod design, or are inoperative due to mechanical or electrical failure, or for other reasons. In other words, this feature of such stepping motor use for the purposes of control rod operations incorporated into the design of the unit an additional element of safety which is of great importance, considering the hazards accompanying the use and operation of such and like reactors.

In each of FIGURES 5a, 8 and 9 we have shown, more or less schematically, the upper portion of a typical control rod at 301, and the lower portion of the element 52 (with suffixes "f" and "g," corresponding to such FIGURES 5 and 9, respectively, for identification). A magnetic clutch 302 is also included between the upper portion of each such control rod showing and the corresponding showing of the element 52. Each such magnetic clutch includes upper and lower clutch elements 303 and 304, respectively, the upper element 303 including (not shown) a magnetizing coil, and the lower element 304 constituting an armature, so that when the magnetizing coil is energized the upper and lower sections or elements 303 and 304 are drivingly locked together, and with sufficient force to sustain the control rod and ensure raising or lowering of such rod under controls effected by the presently disclosed equipment. The clutch energizing lines 305 and 306 are carried down through the hollow element 52 in each case, and are connected to the magnetizing coil at the lower end of such element 52.

Thus, by normally energizing such clutch coil in each case, the corresponding control rod is tied to the element 52, and is moved up and down under control of such element 52; but by discontinuing current to the magnetizing coil the control rod is freed from its element 52, and is allowed to fall by gravity in the reaction reducing or stopping direction to the position of full cut-off.

Although we have not illustrated such control rod and clutch in various of the other embodiments, it will be understood that a like provision may be included with each such embodiment.

We claim:

1. Means to move a control rod of a reactor vertically comprising in combination a vertically movable control rod, a vertically movable control rod supporting element, a motor including a stator element and a rotor element, and driving connections between the rotor element and the control rod supporting element effective to move the supporting element vertically in either the upward or the downward direction, said driving connections including two toothed element driving connections between the rotor element and the vertically movable control rod supporting element, said two toothed element driving connections being constituted for drive of the supporting element at different speed ratios of the supporting element for a selected speed of the motor rotor, and clutching means in each such toothed element driving connections, each such clutching means including means to effect clutching and unclutching operation together with a tension connection between the control rod supporting element and the control rod.

2. Means as defined in claim 1, wherein the two toothed element driving connections are constituted for drive of the supporting element in opposite directions of movement for rotor rotation in a given direction of rotation.

3. Means as defined in claim 2, wherein the motor comprises a stepping motor, and wherein the stator element and the rotor element are constituted to advance the rotor element by pulses applied to the stator element with predetermined angular advance of the rotor element corresponding to each such pulse.

4. Means as defined in claim 1, wherein the motor comprises a stepping motor, and wherein the stator element and the rotor element are constituted to advance the rotor element by pulses delivered to the stator element, with predetermined angular advance of the rotor element corresponding to each such pulse.

5. Means to move a control rod of a reactor vertically and to control such movement, said means comprising in combination, a vertically movable non-rotatable tubular exteriorly threaded control rod supporting element wherein the control rod is received and supported, means to sustain the control rod within said supporting element, means to restrain the exteriorly threaded control rod supporting element against rotation during vertical movements of said element, a rotatable drive sleeve surrounding the tubular control rod supporting element, a stationary housing concentric with and spaced away from the rotatable drive sleeve, means to journal the upper and lower ends of the rotatable drive sleeve to the proximate portions of the housing, a drive nut drivingly secured to the lower end of the drive sleeve below the journal of the lower end of the drive sleeve, said drive nut surrounding and in threading engagement with the exteriorly threaded control rod supporting element, means to journal said drive nut to the housing below the lower end of the drive sleeve, a motor sleeve surrounding the drive sleeve between the journals of the upper and lower ends of the rotatable drive sleeve, journal bearing means between the motor sleeve and the drive sleeve, drive motor means between the motor sleeve and the housing, said motor means including stator and rotor elements, means to secure one of said motor elements to the housing, means to secure the other of said motor elements to the motor sleeve, a set of driving connections between the upper portion of the motor sleeve and the upper portion of the drive sleeve, and a set of driving connections between the lower portion of the motor sleeve and the lower portion of the drive sleeve, said two sets of driving connections being constituted for drive of the rotatable drive sleeve in opposite directions corresponding to rotation of the motor sleeve in a given direction, together with clutch means included in at least one set of said sets of driving connections; wherein there is a clutch means included in each of the two sets of driving connections.

6. Means to move a control rod of a reactor vertically and to control such movement, said means comprising in combination, a vertically movable non-rotatable tubular exteriorly threaded control rod supporting element wherein the control rod is received and supported, means to sustain the control rod within said supporting element, means to restrain the exteriorly threaded control rod supporting element against rotation during vertical movements of said element, a rotatable drive sleeve surrounding the tubular control rod supporting element, a stationary housing concentric with and spaced away from the rotatable drive sleeve, means to journal the upper and lower ends of the rotatable drive sleeve to the proximate portions of the housing, a drive nut drivingly secured to the lower end of the drive sleeve below the journal of the lower end of the drive sleeve, said drive nut surrounding and in threading engagement with the exteriorly threaded control rod supporting element, means to journal said drive nut to the housing below the lower end of the drive sleeve, a motor sleeve surrounding the drive sleeve between the journals of the upper and lower ends of the rotatable drive sleeve, journal bearing means between the motor sleeve and the drive sleeve, drive motor means between the motor sleeve and the housing, said motor means including stator and rotor elements, means to secure one of said motor elements to the housing, means to secure the other of said motor elements to the motor sleeve, and a set of driving connections between the upper portion of the motor sleeve and the upper portion of the drive sleeve; wherein there is clutch means included in said set of driving connections.

7. Means to move a control rod of a reactor vertically comprising in combination, a vertically movable control rod, a vertical screw-threaded control rod supporting element, means to guide said element for vertical movements including means to restrain said screw-threaded element against rotation, a nut element in screw-threading engagement with said screw-threaded element below said guide means, means to journal said nut element for rotation including means to sustain said nut element against downward movement, together with means to rotate the nut element comprising a motor including a stator element and a rotor element and means to journal said rotor element for rotation on an axis substantially parallel to the screw-threaded element, and a driving connection between the rotor and the nut elements, together with a tension connection between the control rod supporting element and the control rod; wherein said control rod supporting element is hollow; together with a clutch unit between the lower end of said control rod supporting element and said control rod, including electric clutching means, together with clutch control lines extending through the hollow control rod supporting element, and connections between said lines and the clutch unit elements.

8. Means to move a control rod of a reactor vertically comprising in combination, a vertically movable control rod, a vertical screw-thread control rod supporting element, means to guide said element for vertical movements including means to restrain said screw-threaded element against rotation, a nut element in screw-threading engagement with said screw-threaded element below said guide means, means to journal said nut element for rotation including means to sustain said nut element against downward movement, together with means to rotate the nut element comprising a motor including stator and rotor elements, means to journal said rotor element for rotation, and driving means between the rotor and the nut element, together with a tension connection between said control rod supporting element and the control rod; wherein the driving means between the rotor and the nut element includes first and second defined gear ratio connections of different speed ratios of the nut element speed compared to the rotor speed, means to make effective one of the first and second defined gear ratio connections, and means to select and make effective said gear ratio connection; wherein said selecting and making effective means comprises clutch means in each of the first and second defined gear ratio connections and the means to select and make effective either of said clutch means.

9. Means as defined in claim 8, wherein the first defined gear ratio connection includes means constituted to produce a lower nut element speed than the second defined gear ratio connection, and wherein said first defined gear ratio connection is constituted for production of raising movement of the control rod.

10. Means as defined in claim 9, together with means constituted for non-locking of the motor shaft against rotation in the motor shaft direction which corresponds to raising the control rod when the clutch for the first defined gear ratio is in clutching engagement, and constituted to lock the motor shaft against rotation in the contrary direction.

(References on following page)

References Cited by the Examiner

UNITED STATES PATENTS

| | | | |
|---|---|---|---|
| 2,418,351 | 4/1947 | Jackson | 318—266 X |
| 2,482,464 | 9/1949 | Chapman | 318—467 |
| 2,490,040 | 12/1949 | Frerer | 318—468 X |
| 2,491,842 | 12/1949 | Wells | 318—103 X |
| 2,857,537 | 10/1958 | McCown | 310—83 |
| 2,860,266 | 11/1958 | Schrader | 310—83 X |
| 2,887,640 | 5/1959 | Thomas | 310—49 X |
| 2,963,590 | 12/1960 | Schultz et al. | 318—102 X |
| 2,976,438 | 3/1961 | Luber et al. | 310—83 |
| 3,038,352 | 6/1962 | Murphy | 310—83 X |
| 3,106,519 | 10/1963 | Schwan et al. | 318—468 X |

FOREIGN PATENTS

| | | |
|---|---|---|
| 789,646 | 1/1958 | Great Britain. |

ORIS L. RADER, *Primary Examiner.*

MILTON O. HIRSHFIELD, *Examiner.*

H. L. HALPERT, D. J. SHREWSBERRY, T. LYNCH,
*Assistant Examiners.*